(12) United States Patent
Weismuller et al.

(10) Patent No.: US 8,335,382 B2
(45) Date of Patent: Dec. 18, 2012

(54) METHOD AND SYSTEM FOR APPLYING SILHOUETTE TRACKING TO DETERMINE ATTITUDE OF PARTIALLY OCCLUDED OBJECTS

(75) Inventors: Thomas P. Weismuller, Orange, CA (US); David L. Caballero, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1380 days.

(21) Appl. No.: 11/750,735

(22) Filed: May 18, 2007

(65) Prior Publication Data
US 2008/0285858 A1 Nov. 20, 2008

(51) Int. Cl.
*G06K 9/62* (2006.01)
(52) U.S. Cl. .................................. 382/209; 382/215
(58) Field of Classification Search ............ 382/209
See application file for complete search history.

(56) References Cited

U.S. PATENT DOCUMENTS

| | | | |
|---|---|---|---|
| 4,575,805 A | 3/1986 | Moermann et al. | |
| 5,127,037 A | 6/1992 | Bynum | |
| 5,377,011 A | 12/1994 | Koch | |
| 6,112,109 A | 8/2000 | D'Urso | |
| 6,493,620 B2 | 12/2002 | Zhang | |
| 6,592,033 B2 | 7/2003 | Jennings et al. | |
| 6,954,551 B2 | 10/2005 | Weismuller | |
| 2005/0025354 A1 | 2/2005 | Macy et al. | |
| 2005/0157919 A1 | 7/2005 | Di Santo et al. | |
| 2009/0184865 A1* | 7/2009 | Val et al. ............ | 342/25 F |

FOREIGN PATENT DOCUMENTS

| | | |
|---|---|---|
| JP | 09128548 | 11/1995 |
| JP | 2001195584 | 7/2001 |
| WO | WO 2007/133085 | 5/2006 |

OTHER PUBLICATIONS

ISASI Forum. Isasi Code of Ethics Canons (Air Safety Through Investigation), Jan.-Mar. 2004, pp. 1-32.
"Identification of Three-Dimensional Objects Using Range Information", Reeves et al, IEEE Trans. on Pattern Analysis and Machine Intelligence, vol. 11, No. 4, 1989.
"Three-Dimensional Shape Analysis Using Moments and Fourier Descriptors", Reeves et al, IEEE Trans. on Pattern Analysis and Machine Intelligence, vol. 10, No. 6, 1988.
Extended Search Report dated Aug. 5, 2010 as to corresponding Application GB0808982.3, 1 page.

* cited by examiner

*Primary Examiner* — Matthew Bella
*Assistant Examiner* — Ruiping Li
(74) *Attorney, Agent, or Firm* — Harness, Dickey & Pierce, P.L.C.

(57) ABSTRACT

A method and system for increasing the certainty of a silhouette matching process, where the process is being used for attitude determination of an object of interest, for example an aircraft. The method involves using one or more mask images that include structure or features that may or may not always be associated with the object of interest, and overlaying the mask image(s) onto a library image of the aircraft. Each pixel of the library image is compared against corresponding pixels of the mask image(s) to determine which pixels represent ambiguous areas of the library image. Those pixels are eliminated from consideration in determining a Fit score, where the Fit score represents a percentage value indicative of a certainty of the matching process in identifying the attitude of the aircraft. The method and system is applicable to a wide ranging variety of object detection applications.

17 Claims, 8 Drawing Sheets

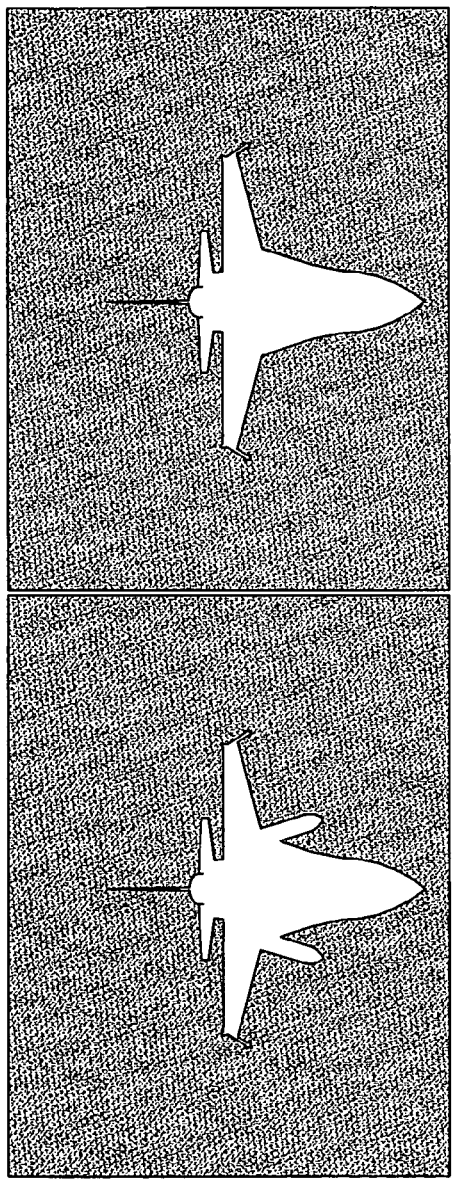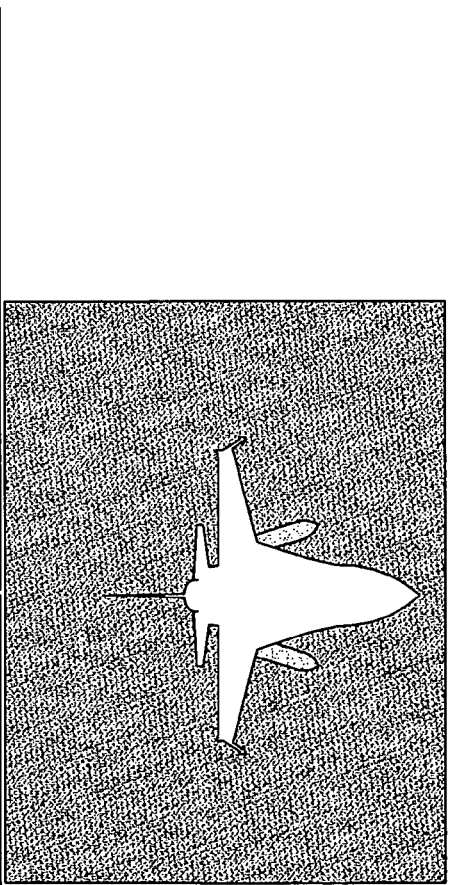

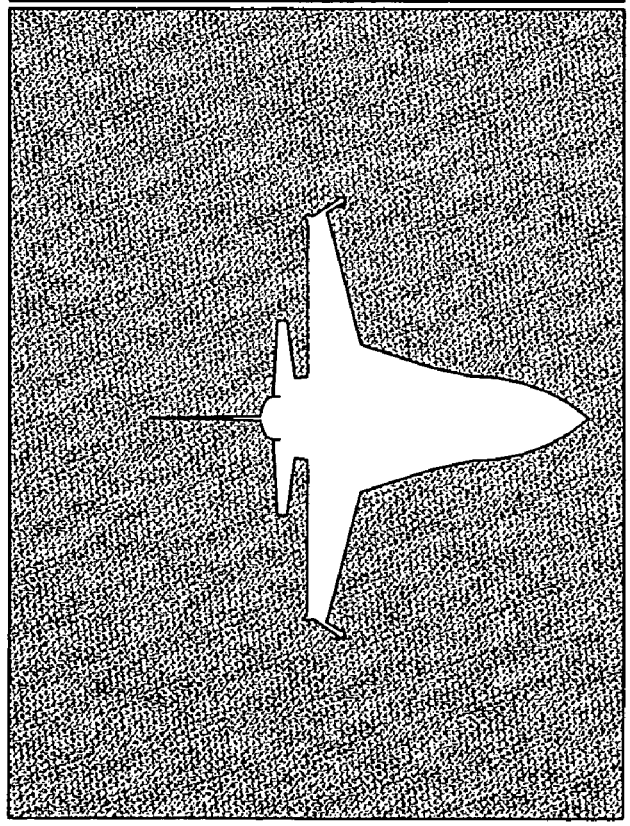
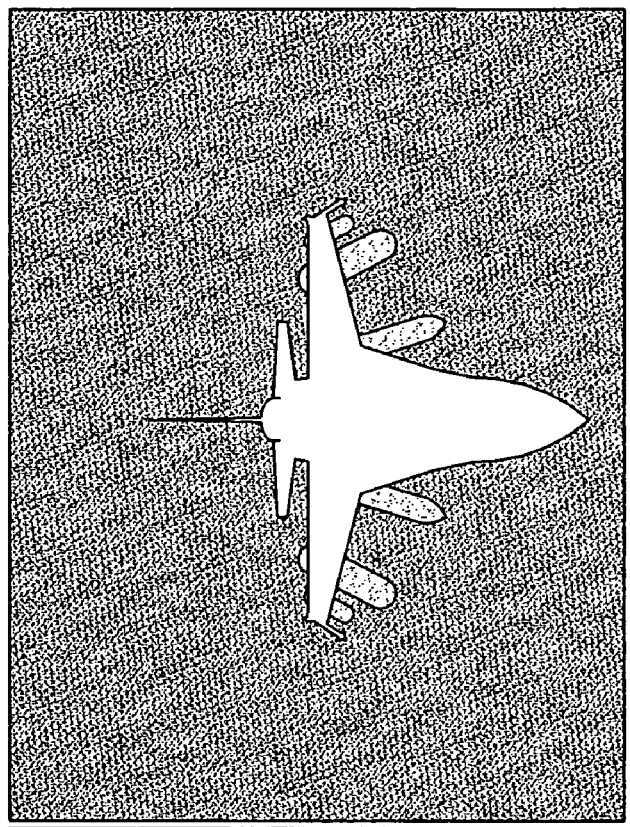
FIG 3B
FIG 3A

METHOD AND SYSTEM FOR APPLYING SILHOUETTE TRACKING TO DETERMINE ATTITUDE OF PARTIALLY OCCLUDED OBJECTS

FIELD

The present disclosure relates to methods and systems for visually determining an attitude of an object, and more particularly to systems and methods that employ the use of mask images to assist in identifying areas of ambiguity of an image of an object being visualized, and removing areas of ambiguity from a matching process to improve the certainty with which an attitude of the object is determined to have.

BACKGROUND

The statements in this section merely provide background information related to the present disclosure and may not constitute prior art.

In many visual attitude determination systems, the shape of the object of interest must be accurately known, since the operation of creating a score to indicate the certainty of a visual attitude determination depends on a close match between the image of the object and a reference image of the object. However, real-world cases often involve objects which have some degree of ambiguity in their shape or silhouette. Examples of this are aircraft with detachable fuel tanks, satellites with articulating solar panels, or aircraft with variable external weapons stores. In these cases, the overall score for comparison of the object with the library image with the correct attitude will be reduced if the object's shape does not exactly match the library image. For example, FIG. 1A shows the binary image of an F-16 aircraft whose attitude is to be determined. However, this particular aircraft has external fuel tanks on the wings which the library image (FIG. 1B) does not have. When attempting to score the "fit" for these two images, even though the actual pitch, yaw, and roll do match exactly, the score is reduced by the mismatch of the additional fuel tanks, as indicated in FIG. 1C. Depending on the degree of mismatch, this could significantly affect the accuracy of the overall "Fit" score. In this case, the Fit score without the tank mismatch would be 100%, but with the mismatch, it would only be about 99.1%. This reduction in the Fit score could be significant for some attitude determination applications.

As shown in the example of an F-16 aircraft mentioned above, such an aircraft can have a relatively large number of different configurations, depending on the number of external fuel tanks and various combinations of ordnance mounted on the wings. Thus, it may not be practical to attempt to create a silhouette library using only one configuration of an F-16 which will be suitable for a particular application. One solution might be to create different libraries for every possible weapons stores/fuel tank combination. However, this may not be practical, since the attitude monitoring system and its software may not recognize a particular aircraft because of a unique weapons stores/fuel tank combination that is not included in one of the libraries. Furthermore, the number of libraries to choose from could be quite large due to the numbers of weapons stores/fuel tank combinations possible.

Other factors that can affect the silhouette of the object being imaged, and thus significantly complicate the task of accurately determining an attitude of the object, can range from minor visual impediments, such as with propeller rotation, to major conditions such as exhaust plume contamination. An exhaust plume can be larger and brighter than the aircraft itself, thus significantly affecting the ability of a visual attitude monitoring/determination system to determine the attitude of the aircraft. Such a severe condition may even prevent any meaningful determination of the object's attitude by the silhouette method, since scoring for a correct determination depends upon a satisfactory pixel-to-pixel match between the object being observed and the library view of the object.

From the foregoing, it should be appreciated that with two dimensional attitude determination of objects, situations may exist where the ability to resolve the attitude of an object is complicated because of structure carried on the object of interest, or external structure that occludes an image of the object of interest. In general, anything that interferes with the fundamental, static silhouette of the object can add significant difficulty into the operation of evaluating the attitude of the object.

SUMMARY

The present disclosure relates to a method and system for using libraries of silhouette images to aid in identifying objects of interest. In one particular implementation, the method and system involves the use of mask library images that aid the process of accurately determining an attitude of an object of interest. In specific examples, the object of interest is described as being an aircraft although the method and system of the present disclosure may be used to identify virtually any type of object.

In one implementation the method may involve examining a library image of the object of interest, and particularly a plurality of pixels representing an image of the object. The pixels of the object are compared to a corresponding plurality of pixels of a selected library image obtained from a library of images. The selected library image may form a "mask" image that includes structure that is not physically a portion of the object, for example a refueling boom that is being used to accomplish mid-air refueling of an aircraft. Alternatively, the selected library image may form a mask image that includes structure that is intermittently present on the object of interest, such as a external fuel tank or a missile mounted under a wing of an aircraft. Still further, the selected library image may form a mask image that includes other visible conditions, such as an exhaust plume from a jet engine of an aircraft that is masking a portion of the image of the object. In practice, the library images form mask images that include any visible structure or other visible condition that may occlude the object of interest in the library image being analyzed.

The comparisons are performed using the library image of the object and the selected mask library image, or images, to identify those areas of ambiguity of the image. The identified areas of ambiguity may then be removed from consideration in determining a level of certainty of the object, and more particularly a level of certainty of the attitude of the object.

In one specific implementation the comparisons are performed sequentially, pixel by pixel, using the library image and the selected library mask image(s). In one specific implementation the comparisons are binary comparisons, where a "yes" or "no" determination is made as to whether a specific pixel of the library image of the object matches a corresponding pixel in the selected mask library image(s). In a different implementation the comparisons are "full intensity" comparisons where a variance value, representing a percentage of full intensity, is assigned for each pixel. Thus, the variance value indicates how close of a match a particular pixel being analyzed is to its corresponding pixel in the selected mask library image(s). The binary or full intensity comparisons may be used with either library mask images of structure or physical conditions associated with the aircraft, or with library mask images of external structure that is not a part of the aircraft.

BRIEF DESCRIPTION OF THE DRAWINGS

The drawings described herein are for illustration purposes only and are not intended to limit the scope of the present disclosure in any way.

FIG. 1A is a prior art illustration of a silhouette image of an aircraft that includes optional fuel tanks mounted underneath the wings thereof;

FIG. 1B is a prior art illustration of a silhouette image of the aircraft of FIG. 1A but without the optional fuel tanks;

FIG. 1C is an illustration showing the area of mismatch between the images of FIGS. 1A and 1B;

FIG. 3A is library image of an F-16 aircraft;

FIG. 3B is a mask image of the F-16 aircraft of FIG. 3A that includes a full complement of optional fuel tanks and weapons stores mounted under the wings of the aircraft;

DETAILED DESCRIPTION

The following description is merely exemplary in nature and is not intended to limit the present disclosure, application, or uses.

U.S. Pat. No. 6,954,551, Method for Determining Attitude of an Object, assigned to The Boeing Company, describes a technique for determining the three-dimensional angular orientation of an object relative to the observer (pitch, yaw, and roll) by use of two-dimensional imagery. The disclosure of this patent is hereby incorporated by reference into the present disclosure. U.S. Pat. No. 6,954,551 has proven valuable for a wide variety of scenarios, including space applications (satellite orientation for approach and docking) and aircraft applications (aircraft attitude during landing and refueling operations). An examination of this patent may be helpful in understanding and appreciating various principles concerning three dimensional attitude determination, as they may apply to the present disclosure.

Figure 2:
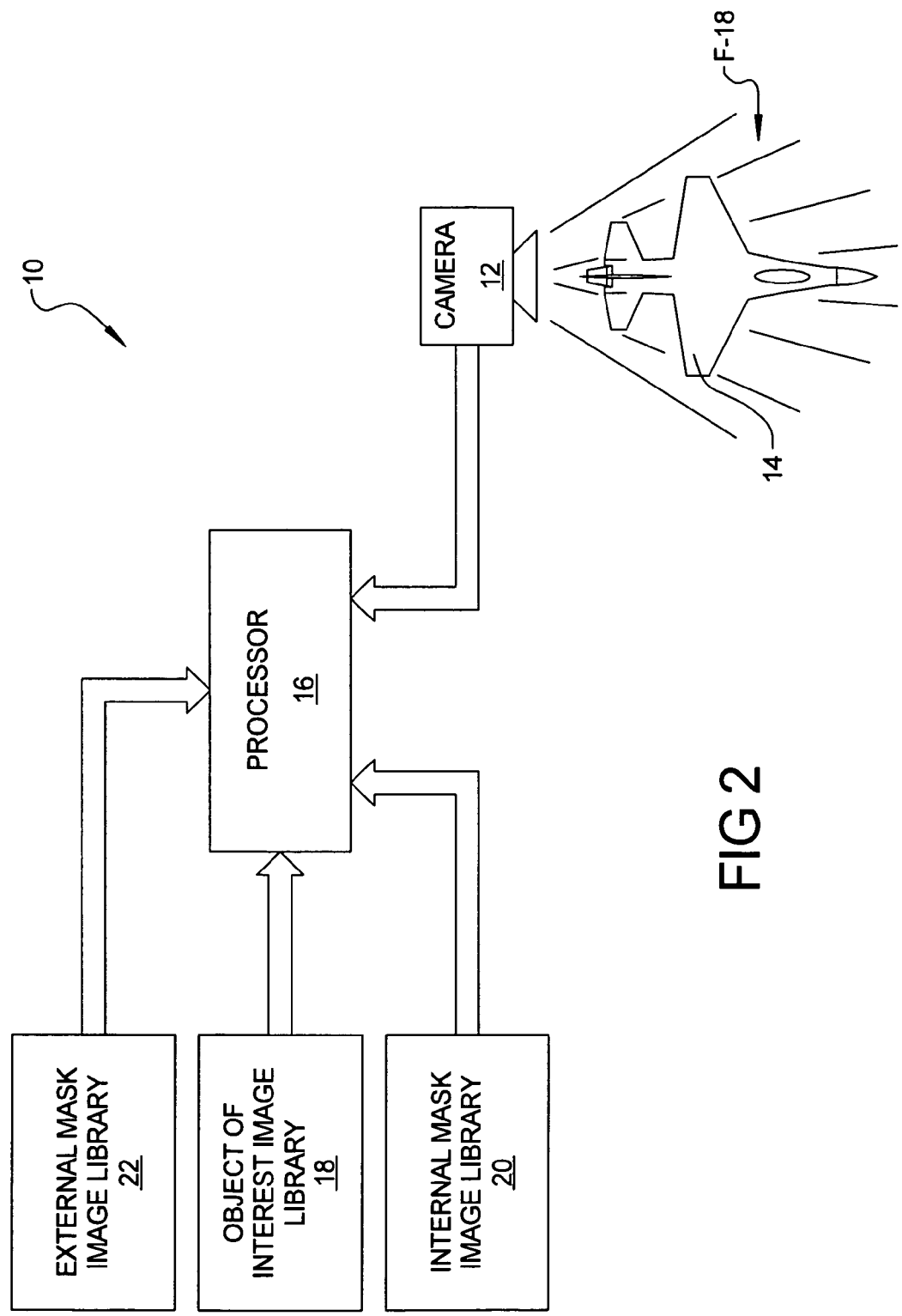
FIG. 2 is a block diagram of major components of one embodiment of an attitude determination system of the present disclosure.

Referring to FIG. 2, an attitude determination system 10 is illustrated in simplified form in accordance with one embodiment of the present disclosure. The system 10 may include a camera 12 for obtaining an image of an object of interest, for example an aircraft 14. The camera 12 is in communication with a processor 16 and provides information (digital or analog) representing the image that it obtains to the processor 16. The processor 16 is in communication with a library 18 of images of objects of interest. The processor 16 is also in communication with one or more libraries of "mask" images 20 and 22. Libraries 18, 20 and/or 22 may be stored in an external non-volatile memory, or they may be stored in memory associated with the processor 16. In either event, the libraries 18, 20 and 22 are readily accessible by the processor 16 so that the processor can quickly retrieve a needed library mask image for comparison to the image being provided by the camera 12.

The mask library 20 is termed an "internal" mask library to denote that it includes mask images of structure that will typically, but intermittently, be included on a given object of interest, together with the object of interest itself. One such mask image is shown in FIG. 3B, where an F-16 aircraft is shown with optional fuel tanks and weapons stores mounted under its wings. FIG. 3A shows how the F-16 aircraft appears without the optional equipment that the mask image includes. Other such "internal" structure might include other electronic equipment carried on the aircraft that affects the silhouette of the aircraft once installed on the aircraft. Still another object that may affect the silhouette might be the jet plume from the engines. Thus, a separate mask image stored in the internal mask library 18 may include the aircraft with an exemplary jet plume projecting therefrom. Virtually any structure or component that may be attached to or associated with the object of interest may be included as a mask image in the internal mask image library 20.

Library 18 comprises a library of images of objects of interest. In this example library 19 comprises a plurality of images of the aircraft 14 at different attitudes.

Figure 4C:
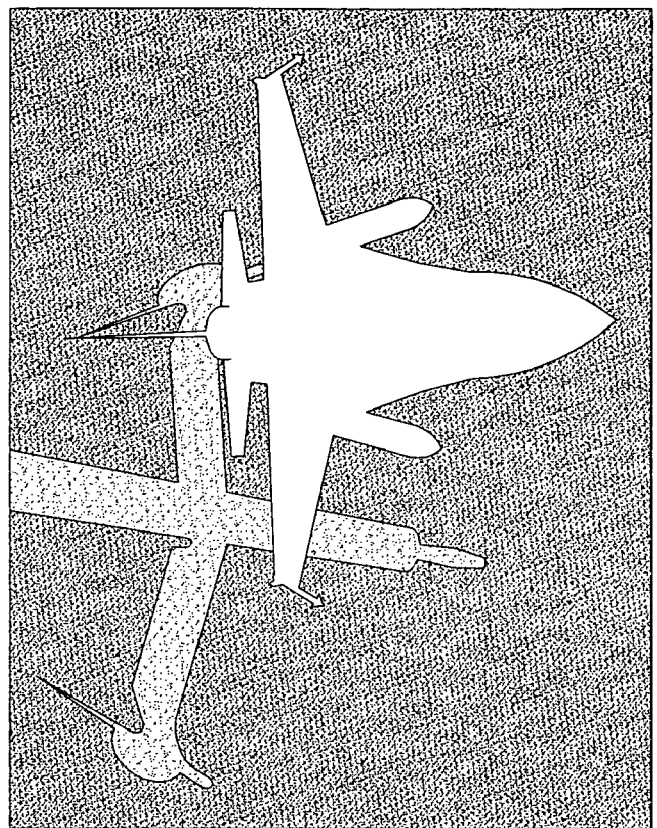
FIG. 4C is a view of the external mask image of the refueling boom (shown in grey) overlayed on a library image of the F-16 aircraft.
Figure 4A:
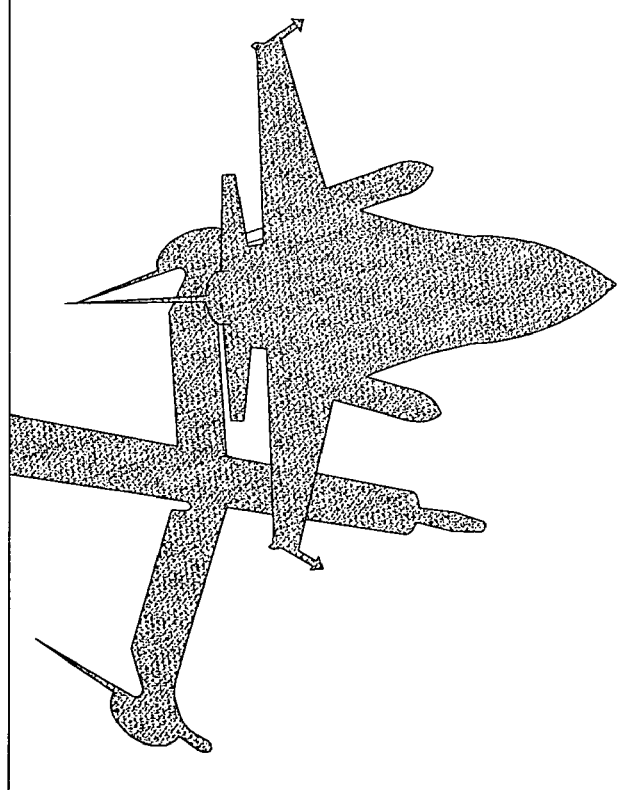
FIG. 4A is a view of an image as seen by a camera, where a refueling boom from a refueling tanker aircraft occludes a portion of an image of an F-16 aircraft being refueled.
Figure 4B:
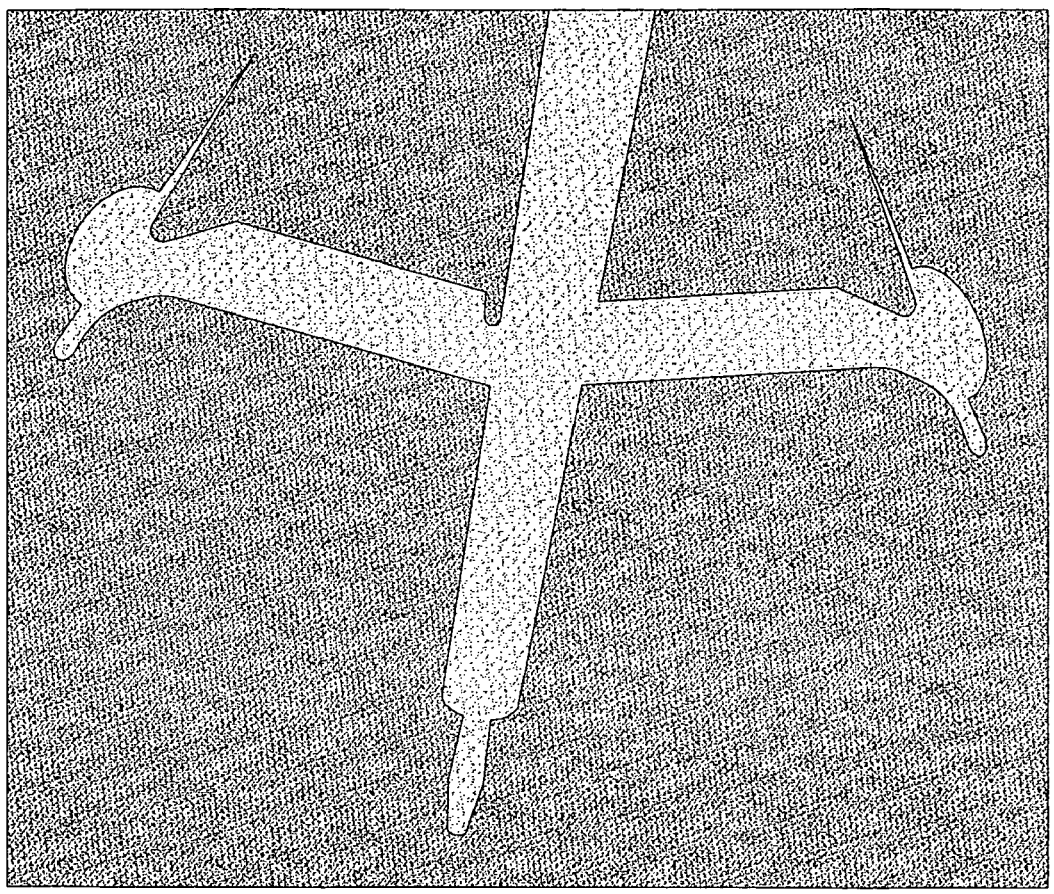
FIG. 4B is a view of an external mask image of the refueling boom.

Referring FIGS. 2 and 4A, 4B and 4C, The "external" mask library 22 includes one or more images of objects that may be encountered when imaging the aircraft 14. One example of such an external mask image is shown in FIG. 4B. FIG. 4B illustrates a refueling boom extending from a refueling tanker aircraft. The image as seen by the camera 12 is shown in FIG. 4A. From FIG. 4A it can be seen that the aircraft is partially occluded by the refueling boom. FIG. 4C illustrates the mask image of FIG. 4B overlayed on the library image of the aircraft.

The external mask library 22 may be stored in an independent non-volatile memory, or it may be stored in non-volatile memory associated with the processor 16. In practice, the libraries 20 and 22 may include mask images associated with a plurality of different aircraft. For example, if an F-18 aircraft is being monitored by the camera 12, the processor 16 may obtain the library image of the F-18 aircraft from library 18, and the mask image(s) from library 20 associated with an F-18 aircraft. Other structure or phenomena (e.g., refueling boom) may be obtained if needed from the external mask library 22.

It will be appreciated the object of interest may involve other types of mobile platforms such as land based motor vehicles, marine vessels, rotorcraft, or even other objects or structures. While it is anticipated that the present disclosure will find particular utility with airborne mobile platforms such as aircraft, and particularly in mid-air refueling operations performed with military aircraft, the object of interest may also be a fixed structure such as a building. With a fixed structure such as a building, one or more mask images could be used to identify if certain appurtenances or structures appear on the building. However, the specific appurtenance or structure would have to be known in advance in order to create the mask image that is stored in the appropriate mask image library (i.e., either library 20 or 22). The present disclosure is anticipated to find utility in applications involving object tracking, target discrimination, target classification, and virtually any other application where visually analyzing/detecting objects is needed.

With further reference to FIG. 2, in general operation the processor 16 obtains the library image of the object of interest from library 18, as well as the available mask image, or images, from one or both of libraries 20 and 22. The processor 16 scales the dimensions of the information shown in the mask image(s) in accordance with the dimensions of the object shown in the library image obtained from library 18. In the aerial refueling example presented herein, information is typically readily available from sensors and other equipment carried on the refueling aircraft that can assist in scaling the library image as needed. Preferably, the library image obtained from library 18 may be analyzed by the processor 16 pixel-by-pixel, in sequential fashion, against corresponding pixels of the selected mask image. The comparisons may be made using a binary process, where a "1" is assigned if the pixel in the library mask image is present (i.e., matches) with the corresponding pixel in the mask image. Alternatively, a "full intensity" comparison may be performed in which a variance score is given for the intensity of each pixel being compared. The variance score may represent an intermediate value between "0", which would correspond to no match, and "1", which would denote a perfect match. Thus, the full intensity comparison results in "grey scale" type evaluation of the pixels, and thus the image, being analyzed.

With either the binary or full intensity comparison process, the comparisons are used to identify those areas of the image of the object that may be discounted when determining a "Fit" score for the matching operation. Thus, the ability to identify and eliminate, from the scoring process, those areas of the image that are ambiguous, can improve the credibility of the resulting Fit score assigned to an attitude determination for the aircraft 14.

Figure 5:
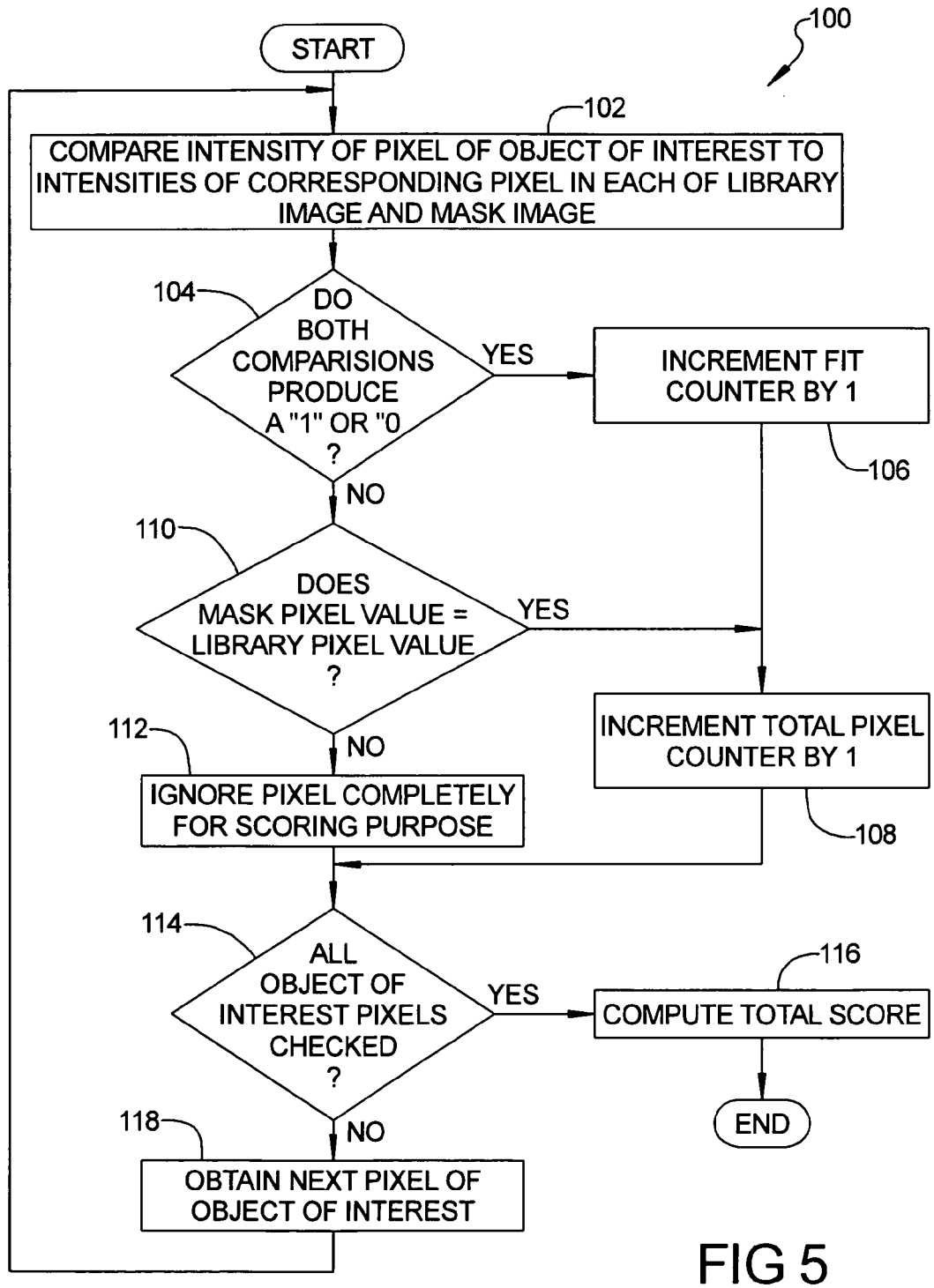
FIG. 5 is a flowchart illustrating one methodology of the present disclosure for making a comparison check between an image of the object and a selected internal mask library image, to identity and eliminate ambiguous areas of the image before determining a Fit score for the matching process.

Referring to FIG. 5, a flowchart 100 is illustrated to explain an exemplary methodology for implementing a binary comparison using an internal mask from the internal mask library 20 (FIG. 1). At operation 102, two binary comparisons are made: 1) between the intensity of a specific pixel of an object of interest, from an image provided by the camera 12, and the intensity of a corresponding pixel of a library image of the object of interest, where the library image is obtained from the library 18; and 2) between the pixel of the object of interest and the corresponding pixel in the mask image obtained from either mask library 20 or 22. At operation 104, a determination is made if both comparisons produce either a "1" or "0", with "1" representing a "yes" answer and "0" representing a "no" answer. If both comparisons produce a "1" or "0" answer, then the processor 16 increments a "Fit" counter by 1, as indicated at operation 106. At operation 108, the processor 16 increments a "total pixel" counter by 1.

If the inquiry at operation 104 produces a "No" answer, then an inquiry is made to determine if the mask image pixel value equals the library image pixel value, as indicated at operation 110. If not, then that particular pixel is ignored completely for scoring purposes, as indicated at operation 112.

After either of operations 112 or 108 are performed, a check is made to determine if all pixels of the object of interest provided from the camera 12 have been checked, as indicated at operation 114. If the answer at operation 114 is "No", then the next pixel of the object of interest is obtained by the processor 16, as indicated at operation 116, and operations 102 and 104 are repeated.

If the answer at operation 114 is "Yes", then a total "Fit" score is computed by the processor 16. The total Fit score will always be "1" or less, and greater than or equal to "0". The Fit score is obtained by dividing the count in the Fit counter (as tallied at operation 106) by the total pixel count stored at operation 108, and multiplying the quotient by 100. A nearly perfect correlation between the sequentially performed pixel comparisons may result in a Fit score very nearly "1", for example 99.98%. A low Fit score may be, for example, 80%. The Fit score of 99.98% represents a high certainty that the attitude of the object of interest is in fact the attitude that has been determined by analysis of the object of interest by the processor 12. The low Fit score of 80% indicates a high degree of uncertainty in the attitude determination of the object of interest.

The foregoing methodology therefore serves to exclude pixels from being included in the process of determining the Fit score where the library image and the mask image each do not match with the pixel of the object of interest. In effect, this serves to eliminate from consideration areas of ambiguity between the library image and object of interest, and between the mask image and the object of interest.

Figure 6:
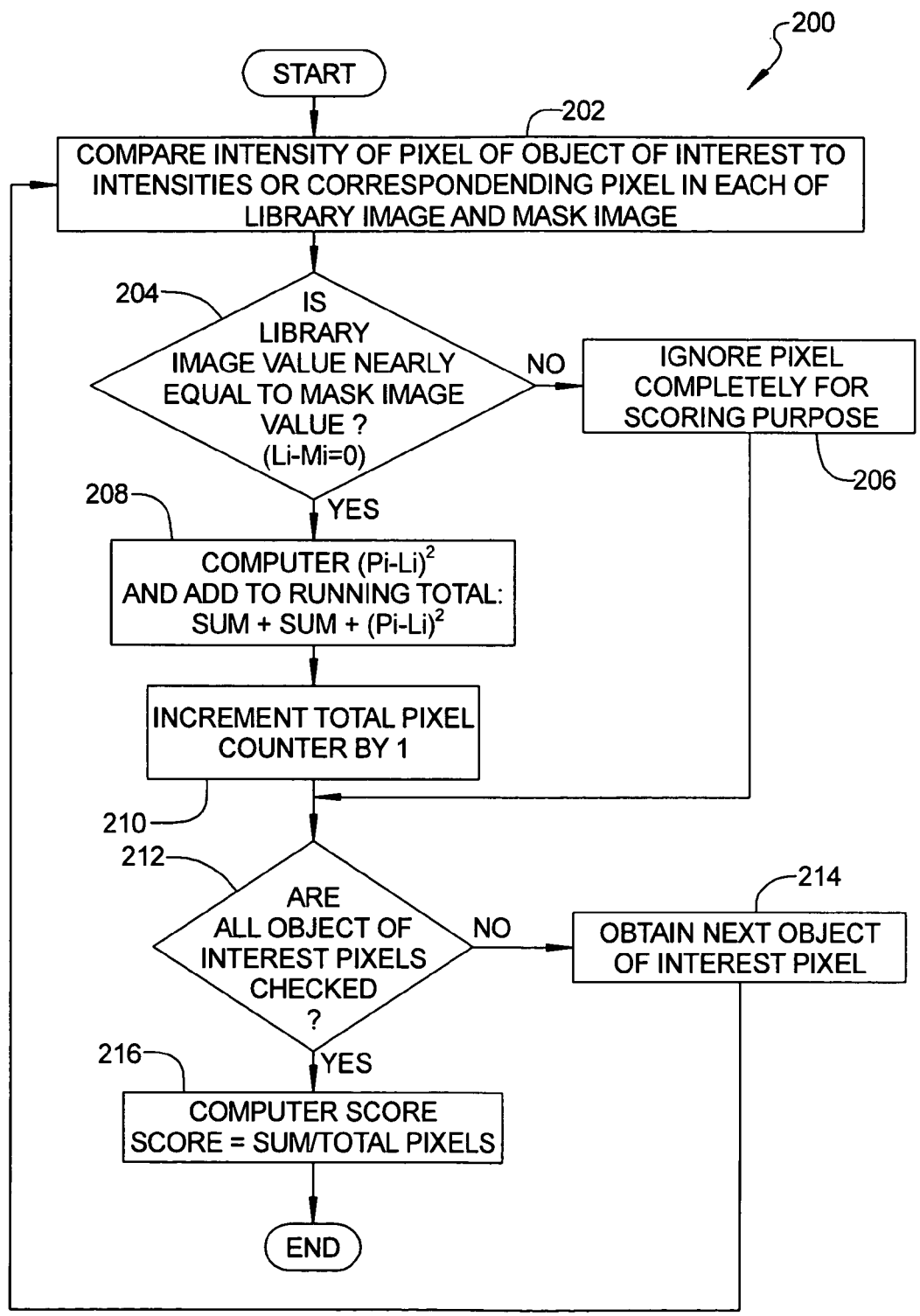
FIG. 6 is a flowchart illustrating one methodology of the present disclosure for making a comparison check between an image of the object and a selected external mask library image, to identify and eliminate ambiguous areas of the image before determining a Fit score for the matching process.

Referring to FIG. 6, a flowchart 200 illustrating an exemplary methodology for implementing a full intensity comparison between pixels, for an internal mask image, is disclosed. At operation 202, an intensity of a pixel of an $i^{th}$ object of interest ($P_i$) is compared to the intensity of a corresponding pixel of the library image, and also to the intensity of a corresponding pixel of the internal mask image. A check is then made If the intensity of the pixel of the library image ($L_i$) is very nearly equal to the intensity of the mask image pixel ($M_i$) (that is, does $L_i-M_i=0$?), as indicated at operation 204. By "very nearly", it may be understood that the pixel of the library image is typically within about 1% in intensity of the corresponding mask image pixel. If the inquiry at operation 104 produces a "No" answer, then the pixel is ignored for scoring purposes, as indicated at operation 206. If the inquiry at operation 204 produces a "Yes" answer, then an absolute value determination is made of the intensity difference between the pixel of the object of interest and the corresponding library image pixel, and this value is added to a summing device, as indicated at operation 208. The total pixel count is then incremented by "1", as indicated at operation 210.

After either of operations 210 or 206 is performed, then a check is made to determine if all object of interest pixels have been checked, as indicated at operation 212. If the answer is "No", then the next pixel of the object of interest is obtained, as indicated at operation 214, and then a loop is made back to operation 202. If the answer at operation 212 is "Yes", then the Fit score is computed by dividing the sum stored in the summing device (at operation 208) by the total number of pixels checked. The Fit score represents a numerical value that will be greater than or equal to 0. A low value near zero means a high certainty that the attitude determination of the object of interest is in fact correct. A high value means a significant degree of uncertainty that the attitude of object is in fact the attitude that has been determined through visual means. Determination of what consists of a high value depends on the actual scenario and is dependent on the imagery and lighting conditions associated with it.

An external library mask image may be substituted in place of the internal library mask image in FIGS. 5 and 6 when making the above-described binary and full intensity comparisons. In practice, typically only one of the following four comparison tests will be performed in any particular scenario:

1) binary comparison using internal library mask image (as shown in FIG. 5);
2) full intensity comparison using internal library mask image (as shown in FIG. 6);
3) binary comparison using external library mask image; and
4) full intensity comparison using external library mask image.

However, it is within the realm of the present disclosure that two or more of the above comparison tests could be performed by the processor 16 and a form of "composite" overall Fit score constructed from the plurality of tests.

Use of the internal and external masks and the scoring methods described above significantly improves the certainty of an attitude determination, where internal or external features may interfere with obtaining a good silhouette of the object of interest. In general, the smaller the area encompassed by the interfering element(s) or features presented in the mask image, the more likely that the results of the comparison with the mask image will yield helpful and satisfactory results.

Figure 7C:
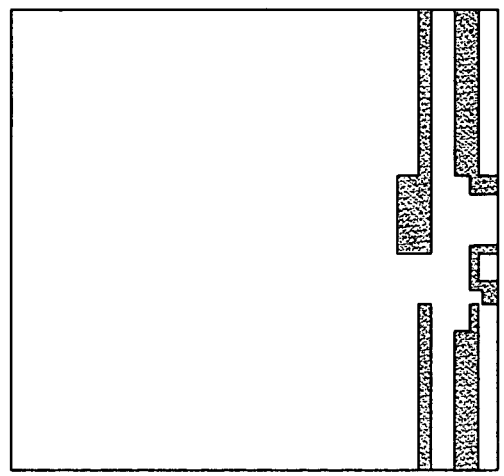
FIG. 7C is an illustration of the like pixels between the two images of FIGS. 7A and 7B shown in white.
Figure 7B:
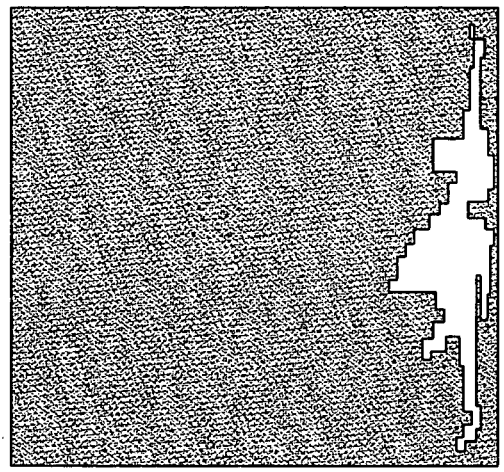
FIG. 7B is library mask image of the F-18 aircraft of FIG. 7A but with the nose pointed slightly up.
Figure 7A:
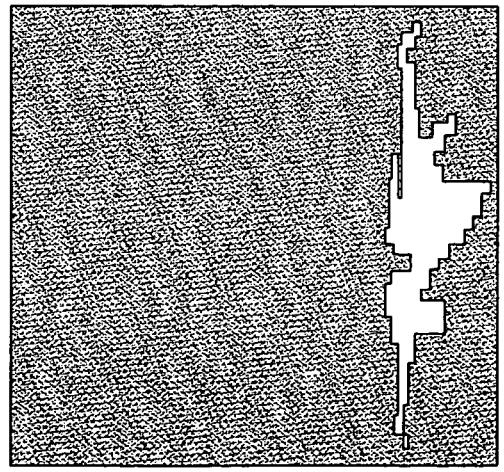
FIG. 7A is a library image of an F-18 aircraft at near zero pitch, with the nose of the aircraft pointed slightly down.

One additional method which may be useful in optimizing the above-described scoring method is applicable to situations involving small targets. By "small" target, it is meant a target that only encompasses a very limited area (e.g., less than 50%, and typically less than 33%) of the overall image being analyzed. An example of a small target could be an aircraft being aerially refueled, where the aircraft is at a near zero pitch to the camera imaging the aircraft. Such an image might appear as shown in FIG. 7A. For such an exemplary small target, it is possible to obtain a good silhouette matching score (i.e., a good Fit score) using the library image, but not actually have a good fit. As a low-resolution example, the image shown in FIG. 7A shows a near-zero pitch target (i.e., aircraft) whose nose points slightly down. FIG. 7B shows a similar library image, but whose nose points slightly up. FIG. 7C shows all pixels that are different (black) and the same (white) between the two images of FIGS. 7A and 7B.

In this case, the count of identical pixels "C" from a comparison of the two images 7A and 7B is quite large due to the majority of the image being empty space. Thus the Fit score using the binary comparison method of FIG. 5 would be very high, even though this is not a good library match to the target image. Note that the large empty space may be nearly filled with detected pixels when evaluating other attitudes (in the case of this aircraft, high-pitch views), but in this specific attitude, the result is a majority of the image that is not relevant to for matching purposes.

As a quality check of the match between the selected best score library image and the target image, two more scores are computed: a target pixel score ("Targscore") and a library pixel score ("Libscore"). The target pixel score is computed as the number of like-value pixels (in FIG. 7C) divided by the total number of detected target pixels. The library pixel score is computed as the number of like-value pixels divided by the total number of library pixels with a value greater than zero. A perfect library fit to the target will result in both the Targscore and Libscore being equal to one. In general, Targscore and Libscore will be less than or equal to one. A threshold on the Targscore and Libscore may be used to estimate the quality of the silhouette matching score. Using the images shown in FIGS. 7A, 7B and 7C will yield a large silhouette matching (i.e., Fit) score but a low Targscore and a low Libscore.

Various prior art systems that have determined attitude by the silhouette method have often depended on having images that were virtually uncontaminated with interfering features. Even so, such methods have often worked satisfactorily for many applications, such as analyzing imagery from fixed-shape satellites, or tracking most types of aircraft The advantage of the methods and systems disclosed in the present disclosure is that silhouette analysis of objects in an even larger variety of applications can be implemented where articulating or external interfering components (such as moveable solar panels on satellites, or refueling booms) are involved. This makes the methods and system of the present disclosure even more robust and versatile without adding significantly to the processing time, while easily allowing prior silhouette matching methods to continue to be used where no masking is required.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for identifying ambiguous areas of an image of an object through analysis of a silhouette of said object, the method comprising:
   using a processor adapted to:
      examine a plurality of pixels representing an image of the object;
      perform a first comparison operation to compare the plurality of pixels to a corresponding plurality of pixels of a selected library image pertaining to the object, where the selected library image is obtained by the processor from a library of images;
      further perform a second comparison operation to compare the plurality of pixels of the image against a selected mask image from a mask image library, the selected mask image including the image of the object and additional structure that is only intermittently associated with the object;
   using said first and second comparisons to generate a score that indicates a level of certainty with which an attitude of said object is identified, and which serves to remove areas of ambiguity of said image from a determination of said attitude, to thus enhance the level of certainty in said attitude determination.

2. The method of claim 1, wherein said selected mask image is scaled in accordance with dimensions of said image of said object before performing said comparisons.

3. The method of claim 1, wherein said selected library image is scaled in accordance with dimensions of said image of said object.

4. The method of claim 1, further comprising using the results of said comparisons to produce a score indicative of said level of certainty with which said object is identified.

5. The method of claim 1, further comprising considering what portion of the image is taken up by the object in providing an additional score relating to a quality of the level of certainty determination being made.

6. A method for identifying and removing ambiguous areas of an image of an object through analysis of a silhouette of said object, to aid in identifying an attitude of said object, the method comprising:

using a processor adapted to:
examine a plurality of pixels representing an image of the object;
sequentially compare a plurality of pixels of said image to a selected library image of the object and also to a selected mask image of the object, where said selected mask image is obtained from at least one library where a plurality of different mask images are stored;
said selected mask image representing an image of the object and at least one known appurtenance that may intermittently be associated with said object, and that modifies a visual presentation of the object;
use said sequential comparisons to identify at least one ambiguous area of said image; and
use said sequential comparisons, taking into consideration the identified at least one ambiguous area of said image, to determine a fitness score that represents a certainty with which said attitude of said object is identified from said image, and which omits consideration of the at least one ambiguous area of said image from said determination of said fitness score.

7. The method of claim 6, further comprising removing said identified ambiguous areas of said image prior to determining said fitness score.

8. The method of claim 6, further comprising scaling said selected mask image prior to performing said comparisons.

9. The method of claim 6, further comprising using the processor to sequentially compare said plurality of pixels of said image of said object to a selected external mask image obtained from a library of a plurality of stored external mask images, the plurality of stored external mask images adapted to further assist in removing areas of ambiguity in said image from consideration in determining said fitness score.

10. The method of claim 6, wherein the operation of performing sequential comparisons comprises performing sequential binary comparisons between said pixels of said image and corresponding pixels of said selected mask image.

11. The method of claim 6, wherein the operation of sequentially comparing comprises:
sequentially performing a plurality of intensity comparisons between a plurality of pixels of said image and corresponding pixels of said selected mask image;
assigning an intensity variance rating to each said comparison; and
using said intensity variance ratings in determining said fitness score.

12. A system for identifying and removing ambiguous areas of an image of an object through analysis of a silhouette of said object, to aid in identifying an attitude of said object, the system comprising:
a camera for obtaining an image of an object of interest;
a library of stored images of objects of interest;
a library of stored mask images relating to the stored images of objects of interest;
a processor in communication with the camera, the library of stored images of objects of interest and the library of stored mask images, the processor configured to:
examine a plurality of pixels representing the image of the object of interest;
sequentially compare:
the plurality of pixels of said image of the object of interest to corresponding pixels of a selected library image from said library of stored images of objects of interest, and also
the plurality of pixels of said image of the object of interest to pixels of a selected mask image, where said selected mask image is obtained from said library of stored mask images, said selected mask image representing the object of interest as well as structure that is not always present with said object, and which is partially obstructing said object in said selected mask image; and
from said sequential comparisons, identify an ambiguous area of said image of an object of interest as an area that does not form part of said object of interest; and
the processor further adapted to remove said ambiguous area from inclusion in a calculation of a certainty score of an attitude of said object of interest.

13. The system of claim 12, wherein said selected mask image is scaled in dimension in accordance with dimensions of said image of said object of interest prior to performing said sequential comparisons.

14. The system of claim 12, wherein said operation of sequentially comparing comprises sequentially performing a plurality of binary comparisons between a plurality of pixels of said image of an object of interest and corresponding pixels of said selected mask image and said selected library image.

15. The system of claim 12, wherein said operation of sequentially comparing comprises sequentially performing a plurality of intensity comparisons between a plurality of pixels of said image of an object of interest and corresponding pixels of said selected mask image, and assigning an intensity variance rating to each said comparison.

16. The system of claim 12, further comprising:
obtaining an internal mask image of said object that includes additional structure located on said object; and
performing a plurality of sequential comparisons between pixels of said image of an object of interest and corresponding pixels of said internal mask image to assist in identifying areas of ambiguity of said image.

17. A method for identifying and removing ambiguous areas of an image of an object through analysis of a silhouette of said object, to aid in identifying an attitude of said object, the method comprising:
using a processor adapted to:
examine a plurality of pixels representing an image of the object;
sequentially compare the pixels of the image with pixels of a library image of the object, where the library image is obtained from a library including a plurality of images of the object;
sequentially compare the plurality of pixels of said image of the object to a selected mask image, where said selected mask image is obtained from at least one library where a plurality of different mask images are stored;
said selected mask image representing at least one of:
an image of the object and at least one known appurtenance that may intermittently be associated with said object; and
an image of the object that also includes an external structure that is not continuously or intermittently part of the object, but which is at least partially occluding said object;
use said sequentially comparisons to identify at least one ambiguous area of said image; and
use said sequential comparisons to determine a fitness score that represents a certainty with which said attitude of said object is identified from said image, and wherein said fitness score does not take into consideration said at least one ambiguous area of said image.

* * * * *